United States Patent [19]

Li

[11] 4,117,218

[45] Sep. 26, 1978

[54] HIGH SOFTENING MALEIC ANHYDRIDE COPOLYMERS

[75] Inventor: George S. Li, Aurora, Ohio

[73] Assignee: The Standard Oil Company, Cleveland, Ohio

[21] Appl. No.: 830,940

[22] Filed: Sep. 6, 1977

[51] Int. Cl.² .................. C08F 222/08; C08K 7/14
[52] U.S. Cl. .................................... 526/272; 428/364
[58] Field of Search ............... 526/272, 290; 428/364

[56] References Cited

U.S. PATENT DOCUMENTS

| | | | |
|---|---|---|---|
| 2,344,676 | 3/1944 | Cline | 526/290 |
| 2,770,614 | 11/1956 | Howarth et al. | 526/290 |
| 2,856,389 | 10/1958 | Fusco et al. | 526/290 |
| 3,423,373 | 1/1969 | Verdol et al. | 526/272 |
| 3,532,672 | 10/1970 | Takahara | 526/272 |
| 3,876,575 | 4/1975 | Hayashi et al. | 526/290 |

*Primary Examiner*—John Kight, III
*Attorney, Agent, or Firm*—John F. Jones; Larry W. Evans

[57] ABSTRACT

High softening polymeric compositions which are composed of maleic anhydride, styrene and indene are described.

6 Claims, No Drawings

HIGH SOFTENING MALEIC ANHYDRIDE COPOLYMERS

The present invention relates to novel polymeric compositions which have high softening temperatures, and more particularly pertains to high softening compositions of low creep characteristics which are composed of maleic anhydride, styrene and indene, and to the process for preparing these compositions.

The novel polymeric products of this invention are prepared by polymerizing maleic anhydride, styrene and indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The peferred method is solution polymerization in an organic solvent in the presence of a free-radical initiator and in the substantial absence of molecular oxygen in the temptrature range of from about 0° to 100° C. Suitable solvents include methyl ethyl ketone, acetone and benzene. Most preferred solvent is methyl ethyl ketone.

The preferred polymeric compositions embodied herein are those resulting from the polymerization of 100 parts by weight of (A) from 20 to 80% by weight of styrene, (B) from 1 to 40% by weight of maleic anhydride, and (C) from 1 to 40% by weight of indene. Most preferred are resins prepared from a monomer mixture of 100 parts by weight of (A) from 50 to 70% by weight of styrene, (B) from 15 to 30% by weight of maleic anhydride, and (C) from 15 to 30% by weight of indene.

The invention can be illustrated in the polymerization of a mixture of styrene, maleic anhydride and indene in methyl ethyl ketone solvent to produce a product having a high ASTM heat-distortion temperature.

The novel polymeric products of this invention are readily processed thermoplastic materials which can be thermoformed into a wide variety of useful articles in any of the conventional ways employed with known thermoplastic polymeric materials, such as by extrusion, milling, molding, drawing, blowing, etc., into pipes, strands, sheets, films, bottles, and the like. These polymeric products can be blended with from 5 to 50 parts by weight per 100 parts of resin of glass fibers and molded into useful articles having improved impact strength and other improved properties.

In the following illustrative examples, the amounts of ingredients are expressed in parts by weight unless otherwise indicated.

EXAMPLE 1

A. A resin was prepared from 50 parts by weight of styrene, 23 parts by weight of maleic anhydride and 27 parts by weight of indene using the following procedure. In a polymerization reactor were placed 50 parts of styrene and 75 parts of methyl ethyl ketone. This mixture was brought to 60° to 65° C. under a nitrogen atmosphere. At this point, a mixture of 27 parts by weight of indene, 23 parts by weight of maleic anhydride, 25 parts by weight of methyl ethyl ketone and 0.2 part of azobisisobutyronitrile was added continuously to the reactor over an 8-hour period. The polymer was isolated by coagulation with a 1:1 volume mixture of benzene:petroleum ether. The solid polymer was separated and dried at reduced pressure and 50° C. for 48 hours. The resinous product was found to have the following properties: ASTM heat-distortion temperature 144° C., ASTM flexural strength $6.19 \times 10^3$ psi, ASTM flexural modulus $6.49 \times 10^5$ psi, ASTM tensile strength $4.54 \times 10^3$ psi, Izod impact strength 0.2 foot pounds per inch of notch and Rockwell hardness (M) 110.

B. A copolymer of 77 parts of styrene and 23 parts of maleic anhydride which is outside the scope of this invention was prepared in accordance with A above except that no indene was used and only maleic anhydride was present in the monomer feed. The final resin was found to have the following properties: ASTM heat-distortion temperature 127° C., flexural modulus $5.05 \times 10^5$ psi, tensile strength $6.41 \times 10^3$ psi and Rockwell hardness (M) 100.

C. A resin was prepared from 55 parts by weight of styrene, 25 parts by weight of maleic anhydride and 20 parts by weight of indene. The procedure was similar to that of A of this example. In the polymerization reactor were placed 55 parts of styrene and 75 parts of methyl ethyl ketone and the mixture was brought to 75° C. under a nitrogen atmosphere. At this point, a mixture of 25 parts of maleic anhydride, 20 parts of indene and 0.2 part of benzoyl peroxide in 25 parts of methyl ethyl ketone was added continuously to the reactor over a 7-hour period. The polymer was isolated and dried as in A of this example.

The resinous product was found to have the following properties: ASTM heat-distortion temperature 144° C., ASTM flexural strength $7.73 \times 10^3$ psi, ASTM flexural modulus $5.31 \times 10^5$ psi, ASTM tensile strength $10.11 \times 10^3$ psi and Rockwell hardness (M) 106.

D. A resin was prepared from 60 parts by weight of styrene, 25 parts by weight of maleic anhydride and 15 parts by weight of indene. The procedure was similar to that of A of this example. In the polymerization reactor were placed 60 parts of styrene and 25 parts of methyl ethyl ketone and the mixture was brought to 75° C. under a nitrogen atmosphere. At this point, a mixture of 25 parts of maleic anhydride, 15 parts of indene and 0.2 part of benzoyl peroxide in 25 parts of methyl ethyl ketone was added continuously to the reactor over a 7-hour period. The polymer was isolated and dried as in A of this example.

The resinous product was found to have the following properties: ASTM heat-distortion temperature 116° C., ASTM flexural strength $6.68 \times 10^3$ psi, ASTM flexural modulus $4.63 \times 10^5$ psi, ASTM tensile strength $7.12 \times 10^3$ psi and Rockwell hardness (M) 100.

E. A resin was prepared from 70 parts by weight of styrene, 15 parts by weight of maleic anhydride and 15 parts by weight of indene. The procedure was similar to that of Example 1A. In the polymerization reactor were placed 70 parts of styrene and 75 parts of methyl ethyl ketone. A mixture of 15 parts of maleic anhydride, 15 parts of indene and 0.2 part of azobisisobutyronitrile in 25 parts of methyl ethyl ketone was added continuously over a 7-hour period. The polymer was isolated and dried as in Example 1A.

The resinous product was found to have the following properties: ASTM heat-distortion temperature 107° C., ASTM flexural strength $2.99 \times 10^3$ psi, ASTM flexural modulus $4.50 \times 10^5$ psi, ASTM tensile strength $1.53 \times 10^3$ psi and Rockwell hardness (M) 93.

EXAMPLE 2

A 30-gram sample of the polymer described in Example 1A was mixed with 12 grams of ¼-inch glass fibers (PPG 3303) and blended in a Brabender plasticorder at 230° C. for 5 minutes. The resulting blend was found to have the following properties: ASTM heat-distortion temperature 175° C., flexural strength $9.51 \times 10^3$ psi, flexural modulus $9.93 \times 10^5$ psi, tensile strength $5.74 \times 10^3$ psi, and notched Izod impact strength 0.5 foot pounds per inch of notch.

I claim:

1. The composition resulting from the polymerization of 100 parts by weight of
   (A) from 20 to 80% by weight of styrene,
   (B) from 1 to 40% by weight of maleic anhydride, and
   (C) from 1 to 40% by weight of indene, wherein the combined weight percentages of (A) plus (B) plus (C) always equal 100%.

2. The composition of claim 1 wherein (A) is present in from 50 to 70% by weight, (B) is present in from 15 to 30% by weight and (C) is present in from 15 to 30% by weight.

3. The process comprising polymerizing in the presence of a free radical initiator in the substantial absence of molecular oxygen at a temperature in the range of from about 0° to 100° C. in an organic solvent 100 parts by weight of
   (A) from 20 to 80% by weight of styrene,
   (B) from 1 to 40% by weight of maleic anhydride, and
   (C) from 1 to 40% by weight of indene, wherein the combined weight percentages of (A) plus (B) plus (C) always equal 100%.

4. The process of claim 3 wherein (A) is present in from 50 to 70% by weight, (B) is present in from 15 to 30% by weight and (C) is present in from 15 to 30% by weight.

5. The process of claim 4 wherein the organic solvent is methyl ethyl ketone.

6. The composition of claim 1 which is blended with from 5 to 50 parts by weight of glass fibers.

* * * * *